United States Patent
Jung et al.

(10) Patent No.: US 9,606,379 B2
(45) Date of Patent: Mar. 28, 2017

(54) LIGHT MODULATING APPARATUS AND METHOD OF DRIVING THE SAME

(71) Applicant: SAMSUNG ELECTRONICS CO., LTD., Suwon-si (KR)

(72) Inventors: Myounghoon Jung, Bucheon-si (KR); Duhyun Lee, Yongin-si (KR); Byungkyu Lee, Seoul (KR); Yongjoo Kwon, Yongin-si (KR); Yonghwa Park, Yongin-si (KR); Seungjun Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/810,861

(22) Filed: Jul. 28, 2015

(65) Prior Publication Data

US 2016/0062153 A1 Mar. 3, 2016

(30) Foreign Application Priority Data

Sep. 1, 2014 (KR) .................. 10-2014-0115685

(51) Int. Cl.
*G02F 1/03* (2006.01)
*G02F 1/00* (2006.01)
*G02F 1/017* (2006.01)
*G02F 1/01* (2006.01)
*G02F 1/015* (2006.01)

(52) U.S. Cl.
CPC ........ *G02F 1/01716* (2013.01); *G02F 1/0121* (2013.01); *G02F 2001/0155* (2013.01); *G02F 2203/12* (2013.01)

(58) Field of Classification Search
USPC .................................. 359/237–270
See application file for complete search history.

(56) References Cited

U.S. PATENT DOCUMENTS 5,670,977 A * 9/1997 Chiu .................. G02B 26/0841
345/205
5,767,924 A * 6/1998 Hiroki ...................... G09G 3/36
348/749

(Continued)

FOREIGN PATENT DOCUMENTS

JP 3326640 B2 9/2002
JP 2006-186897 A 7/2006

(Continued)

OTHER PUBLICATIONS

Hornbeck, "Combining Digital Optical MEMS, CMOS and Algorithms for Unique Display Solutions", 2007, 8 pages total, IEEE, Plano, Texas, USA, December.

*Primary Examiner* — Mohammed Hasan
(74) *Attorney, Agent, or Firm* — Sughrue Mion, PLLC (57) ABSTRACT

Disclosed is a light modulating apparatus. The light modulating apparatus includes a pixel array including a plurality of pixels, a light modulating device that absorbs or transmit light incident on the pixel array according to an applied voltage, a flip-flop circuit that outputs a first voltage based on a device driving signal indicating a level of a second voltage applied to be applied to the light modulating device, and an amplifier that amplifies the first voltage to generate the second voltage and applies the second voltage to the light modulating device.

19 Claims, 7 Drawing Sheets

(56) References Cited

U.S. PATENT DOCUMENTS

2003/0012244 A1* 1/2003 Krasulick .............. B82Y 20/00
372/50.1
2007/0132696 A1* 6/2007 Yamashita ........... G09G 3/3688
345/98

FOREIGN PATENT DOCUMENTS

| JP | 4416901 B2 | 2/2010 |
| JP | 5215534 B2 | 6/2013 |

* cited by examiner

APPLIED VOLTAGE = 0
UV TRANSMISSION

APPLIED VOLTAGE > 0
UV ABSORPTION

LIGHT MODULATING APPARATUS AND METHOD OF DRIVING THE SAME

CROSS-REFERENCE TO RELATED APPLICATION

This application claims priority from Korean Patent Application No. 10-2014-0115685, filed on Sep. 1, 2014 in the Korean Intellectual Property Office, the disclosure of which is incorporated herein in its entirety by reference.

BACKGROUND

1. Field

The present disclosure relates to a light modulating apparatus and a method of driving the same.

2. Description of the Related Art

A multi quantum well (MQW) device is a device which transmits or absorbs light according to an applied voltage. In the MQW device, an energy band moves up or down according to an applied voltage, and thus, effective band gap energy is changed. When band gap energy changes, the range of wavelengths that the MQW device may transmit or absorb changes as well. Therefore, an optical characteristic of the MQW device is changed according to an external voltage applied to the MQW device.

The MQW device may be used as an optical shutter, which is a single device. Also, by using a type which is arranged in plurality, the MQW device may be used as a modulator for light computing or an optical modulator such as mask lithography.

Generally, in a modulator for modulating light, a digital light processor (DLP) is mainly used. In the DLP, since a modulator is mechanically controlled, there is a limitation to driving the modulator at a high speed. When light is modulated by the MQW device, electrical control is performed, and thus, it is possible to drive the modulator at a high speed.

SUMMARY

Provided is a light modulating apparatus which effectively modulates light by using a circuit device for changing a level of a voltage.

Additional aspects will be set forth in part in the description which follows and, in part, will be apparent from the description, or may be learned by practice of the presented exemplary embodiments.

According to an aspect of an exemplary embodiment, a light modulating apparatus includes: a pixel array including a plurality of pixels on which light is incident; a light modulating device that adjusts an amount of the incident light to be absorbed according to an applied voltage; a flip-flop circuit that outputs a first voltage based on a device driving signal indicating a level of a second voltage to be applied to the light modulating device; and an amplifier that amplifies the first voltage to the second voltage, and applies the second voltage to the light modulating device.

The flip-flop circuit may apply the first voltage to a first transistor, whose a drain electrode is connected to the light modulating device, among a plurality of transistors configuring the amplifier, based on a first device driving signal, and the flip-flop circuit may apply the first voltage to a second transistor, whose a source electrode is connected to the light modulating device, among the plurality of transistors configuring the amplifier, based on a second device driving signal.

The first voltage is output to the first transistor, and the amplifier amplifies the first voltage to the second voltage, and applies the second voltage to the light modulating device.

When the second voltage is applied to the light modulating device, a light absorption coefficient of a material which is included in the light modulating device may be changed.

Each of the plurality of pixels may include: a word line; a bit line; and an on/off transistor. When a voltage applied to the word line is equal to or higher than a certain value, the on/off transistor may receive the device driving signal through the bit line.

The flip-flop circuit may include: a first flip-flop circuit that stores the first voltage acquired based on the device driving signal; and a second flip-flop circuit that is connected to the first flip-flop circuit, and outputs the stored first voltage to the amplifier.

When the first voltage is stored in a corresponding pixel included in the pixel array, the first flip-flop circuit may output the first voltage stored in the second flip-flop circuit.

The light modulating apparatus may further include an output control circuit that supplies an output signal to the first flip-flop circuit and the second flip-flop circuit in response to the first voltage being stored in a corresponding pixel included in the pixel array.

The amplifier may be connected between the flip-flop circuit and the light modulating device.

The light modulating device may include a diode that includes a multi quantum well (MQW) material.

According to an aspect of another exemplary embodiment, a method of driving a light modulating apparatus including a pixel array, a light modulating device, and a flip-flop circuit is provided The method may include: outputting a first voltage from the flip-flop circuit; applying the first voltage to one of a plurality of transistors connected to the flip-flop circuit; amplifying the applied first voltage to a second voltage, and applying the second voltage to the light modulating device; and adjusting an amount of light to be absorbed by the light modulating device according to the applied second voltage.

The flip-flop circuit may apply the first voltage to a first transistor, whose a drain electrode is connected to the light modulating device, among a plurality of transistors, based on a first device driving signal, and the flip-flop circuit may apply the first voltage to a second transistor, whose a source electrode is connected to the light modulating device, among the plurality of transistors, based on a second device driving signal.

The amplifying may include amplifying the first voltage to generate the second voltage when the first voltage is output to the first transistor, and applying the generated second voltage to the light modulating device.

The adjusting may include changing a light absorption coefficient of a material included in the light modulating device in response to the second voltage being applied to the light modulating device.

The method may further include: selecting, from the pixel array, a pixel to which a voltage being equal to or higher than a certain value is applied; and transferring a device driving signal to the selected pixel.

The amplifying may include: storing the first voltage, acquired based on the device driving signal, in the selected pixel; and amplifying the first voltage stored in the selected pixel.

The method may further include, when the first voltage is stored in a corresponding pixel included in the pixel array, outputting the stored first voltage to one of the plurality of transistors.

The method may further include generating an output signal in response to the first voltage being stored in the corresponding pixel included in the pixel array; and transferring the output signal to the pixel selected from the pixel array

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects.

Exemplary embodiments capable of being easily embodied by those of ordinary skill in the art will now be described in detail with reference to the accompanying drawings. The embodiments may, however, be implemented in many different forms and should not be construed as being limited to the embodiments set forth herein. In the accompanying drawings, a portion irrelevant to a description of the embodiments will be omitted for clarity, and like reference numerals refer to like elements.

In this disclosure below, when one part (or element, device, etc.) is referred to as being 'connected' to another part (or element, device, etc.), it should be understood that the former may be 'directly connected' to the latter, or 'electrically connected' to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

Hereinafter, exemplary embodiments will be described in detail with reference to the accompanying drawings.

Figure 1:
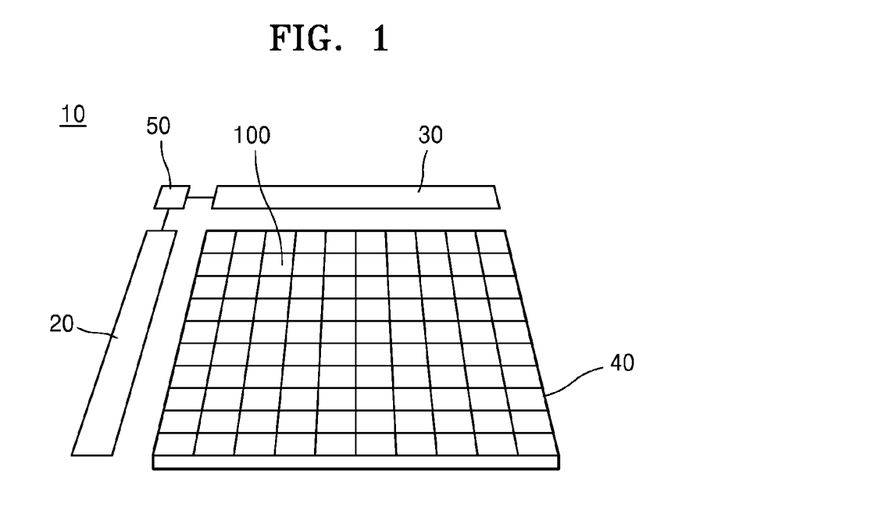
FIG. 1 is a conceptual diagram of a light modulating apparatus according to an exemplary embodiment.

FIG. 1 is a conceptual diagram of a light modulating apparatus 10 according to an exemplary embodiment. As illustrated in FIG. 1, the light modulating apparatus 10 according to an exemplary embodiment may include a pixel array 40, a row driver 20, and a column driver 30.

However, the light modulating apparatus 10 is not limited to an exemplary embodiment described with reference to FIG. 1. The light modulating apparatus 10 may be implemented with more or less elements than the number of illustrated elements. For example, the row driver 20 and the column driver 30 may be provided outside the light modulating apparatus 10.

Hereinafter, the elements will be sequentially described.

The light modulating apparatus 10 controls a characteristic of light incident on the pixel array 40, based on a device driving signal generated from the column driver 30. The pixel array 40 includes a plurality of pixels, including a pixel 100, and each of the plurality of pixels may process an information signal to provide the processed information signal for a user through the light modulating apparatus 10. Here, each of the plurality of pixels may be a unit where the information signal is processed.

Moreover, the device driving signal may include information about a characteristic of light which may be modulated in order for the information signal to be applied to the light. The characteristic of the light may include an amplitude, a phase, a wavelength, and a polarization state of the light. For example, the light modulating apparatus 10 may change the characteristic of the light, based on the device driving signal, and thus, an information signal, including image information or voice information, may be applied to light incident on the pixel 100.

The light modulating apparatus 10 may modulate light having an ultraviolet (UV) range mainly used for digital lithography. However, this is merely an example, and light modulated by the light modulating apparatus 10 is not limited to the light having a UV range.

The light modulating apparatus 10 according to an exemplary embodiment modulates light by using electro-absorption. The electro-absorption may denote a phenomenon in which physical properties of a semiconductor material are changed when a voltage is applied to the semiconductor material, and thus, an absorption rate of light incident on the semiconductor material is changed.

For example, when light is incident on the light modulating apparatus 10, the light modulating apparatus 10 may apply a modulation voltage to a semiconductor material of the light modulating apparatus 10, based on a preset light absorption rate. The light modulating apparatus 10 may apply the modulation voltage to the semiconductor material to adjust the light absorption rate of the semiconductor material. Here, the semiconductor material may include an MQW. An electro-absorption phenomenon, in which the light absorption rate of the semiconductor material is controlled, will be described in detail with reference to FIGS. 2 and 3.

A voltage having a certain level or more may be applied to a light modulating device of the pixel 100 in order for the light modulating apparatus 10 to apply the modulation voltage to a semiconductor material performing electro-absorption. Here, a voltage applied to the light modulating device is lower than a voltage applied to other elements configuring a circuit. Therefore, a higher voltage than a voltage applied to elements configuring a circuit may be applied to a pixel, for driving the light modulating device.

The light modulating apparatus 10 according to an exemplary embodiment may apply a first voltage that is lower than a voltage which is applied to the pixel 100 so as to drive the existing light modulating device. In the light modulating apparatus 10, the applied first voltage may be amplified to a second voltage in the pixel 100, and thus, a voltage for driving a light modulating device may be generated even without applying a high voltage to the pixel 100. According to an exemplary embodiment, a light modulating operation may be performed by applying a low voltage to the pixel array 40 of the light modulating apparatus 10, and thus, a limitation of time which is consumed by applying a high voltage is overcome.

Each of the plurality of pixels, including the pixel 100, included in the pixel array 40 may be connected to the row driver 20 and the column driver 30.

The row driver 20 is disposed at one side of the pixel array 40. For example, the row driver 20 may be disposed in a direction vertical to the pixel array 40. The row driver 20 may select a certain row of the pixel array 40, and change the state of pixels included in the selected row from a turn-off state to a turn-on state. When the pixels included in the selected row are in the turn-on state, the column driver 30 may transfer a device driving signal to the pixels included in the selected row.

The column driver 30 is disposed at another side of the pixel array 40 which is in a direction perpendicular to the direction of the row driver 20. For example, the column driver 30 may be disposed in a direction horizontal to the pixel array 40.

Figure 2:
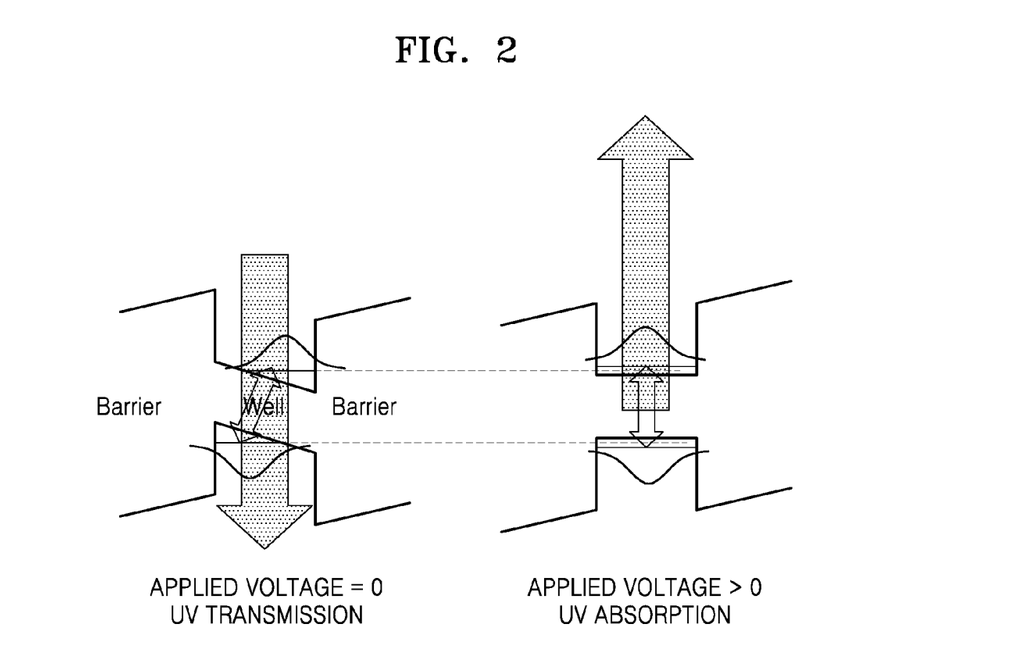
FIGS. 2 and 3 are diagrams for describing an operation of an MQW which is a semiconductor material performing electro-absorption, according to an exemplary embodiment.
Figure 3:
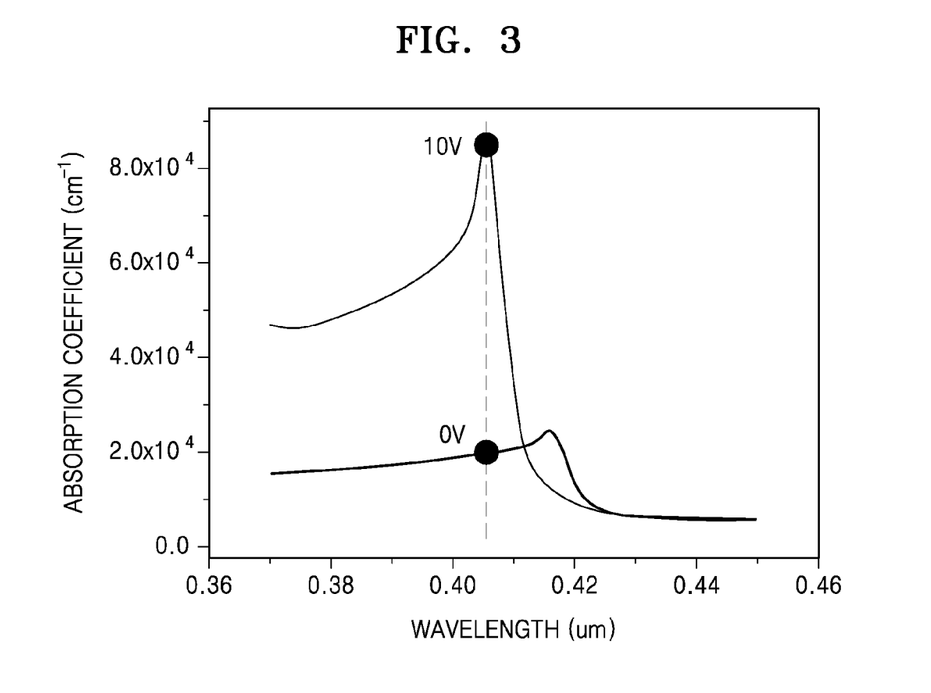

FIGS. 2 and 3 are diagrams for describing an operation of an MQW which is a semiconductor material performing electro-absorption, according to an exemplary embodiment.

As illustrated in FIG. 2, in the MQW, the amount of absorbed light is changed based on an intensity of an applied modulation voltage. An electro-absorption phenomenon, in which the amount of absorbed light is changed based on an intensity of an applied modulation voltage, may occur when a band gap structure of the MQW is changed by an applied voltage, and generation of an electron-hole pair based on light absorption is affected by the change in the band gap structure.

FIG. 3 shows a calculation result of a light absorption coefficient of an InGaN well layer in an InGaN/GaN MQW according to an exemplary embodiment. The InGaN/GaN MQW is designed for modulating UV light of 405 nm. The MQW has a low absorption coefficient when the modulation voltage is not applied. However, it may be seen that when the modulation voltage of 10 V is applied, an absorption coefficient rapidly increases by four or more times. An absorption rate of light having a certain wavelength of a semiconductor material is adjusted according to a change in an absorption coefficient, a transmittance or a reflectance of the semiconductor material may be modulated. The absorption rate may increase as the modulation voltage increases.

Figure 4:
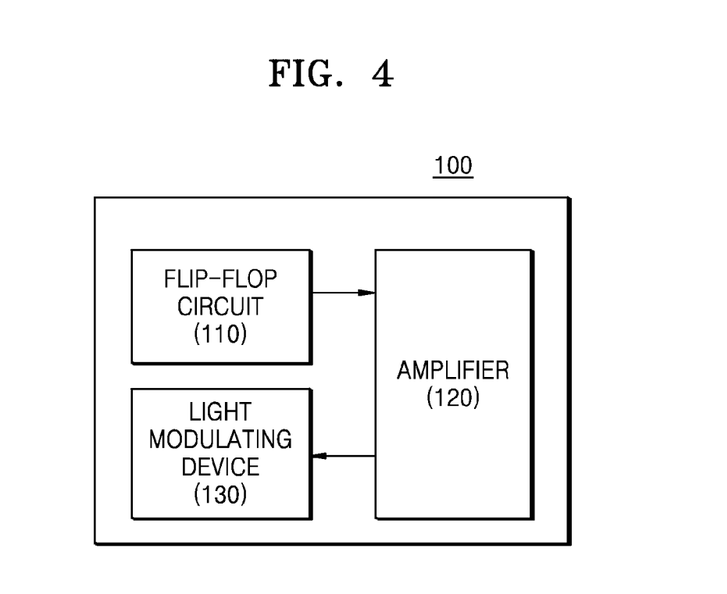
FIG. 4 is a conceptual diagram schematically illustrating a pixel which modulates incident light, according to an exemplary embodiment.

FIG. 4 is a conceptual diagram schematically illustrating the pixel 100 which modulates incident light, according to an exemplary embodiment.

As illustrated in FIG. 4, the pixel 100 may include a flip-flop circuit 110, an amplifier 120, and a light modulating device 130. However, the pixel 100 is not limited to an exemplary embodiment described with reference to FIG. 4. The pixel 100 may be implemented with more or less elements than the number of illustrated elements. For example, the pixel 100 may further include a word line, a bit line, an on/off transistor, and a transfer line. Elements which are not disclosed in FIG. 4 will be described in detail with reference to FIGS. 5 to 7.

Hereinafter, the elements will be sequentially described.

The flip-flop circuit 110 may be supplied with a device driving signal generated from the column driver 30 of FIG. 1. The flip-flop circuit 110 may be supplied with a first voltage having a certain level according to the supplied device driving signal. The flip-flop circuit 110 may store the supplied first voltage.

When the supplied device driving signal is 0, the flip-flop circuit 110 may store a voltage corresponding to the device driving signal "0". For example, when the device driving signal is 0, the flip-flop circuit 110 may store a voltage of 0.5 V. Also, when the supplied device driving signal is 1, the flip-flop circuit 110 may store a voltage corresponding to the device driving signal "1". For example, when the device driving signal is 1, the flip-flop circuit 110 may store a voltage of 3.3 V. However, this is merely an example, and a level of a voltage stored by the flip-flop circuit 110 is not limited thereto.

The amplifier 120 amplifies the first voltage to a second voltage. When the device driving signal is 1, the amplifier 120 may amplify the first voltage stored in the flip-flop circuit 110 to generate the second voltage. The amplifier 120 may apply the generated second voltage to the light modulating device 130. Here, the second voltage may refer to a voltage having a level that is able to change an absorption coefficient of a semiconductor material of the light modulating device 130.

When the second voltage is applied to the light modulating device 130, the light modulating device 130 changes an absorption coefficient of a material included in the light modulating device 130. The light modulating device 130 may change the absorption coefficient of the material to determine whether to absorb or transmit light incident on the pixel 100. In addition, the light modulating device 130 may change the absorption coefficient to determine how far into the material the light penetrates before it is absorbed.

The pixel 100 may interoperate with other pixels included in the pixel array 40. When the pixel 100 interoperates with the other pixels, the flip-flop circuit 110 may not perform an operation of amplifying the first voltage until the device driving signal is transferred to all the pixels selected from among a plurality of pixels in the pixel array 40.

When the device driving signal is transferred to all the selected pixels and the first voltage is stored, the flip-flop circuit 110 may receive a transfer signal. Here, the transfer signal may be transferred from the transfer line (not shown) to the pixel 100. A method of transferring the transfer signal to the pixel 100 will be described with reference to FIG. 7 in detail.

When the pixel 100 interoperates with the other pixels, an operation of the flip-flop circuit 110 will be described in detail with reference to FIG. 6.

The light modulating device 130 may change a light absorption coefficient of a semiconductor material included in the light modulating device 130 by using the second voltage generated by the amplifier 120, thereby modulating light incident on the pixel 100. For example, the light modulating device 130 may be a diode including an MQW.

The second voltage is applied to the light modulating device 130, and thus, when an absorption coefficient of the MQW increases, the light modulating device 130 absorbs light. When a voltage is not applied to the light modulating device 130, the absorption coefficient of the MQW is maintained low, and thus, the light modulating device 130 transmits light. For example, the second voltage amplified from 3.3 V to 8.5 V is applied to the light modulating device 130, and thus, when the absorption coefficient of the MQW increases, the light modulating device 130 absorbs light. However, when a voltage applied to the light modulating device 130 is maintained as 3.3 V, light may be poorly absorbed and pass through the pixel 100.

Figure 5:
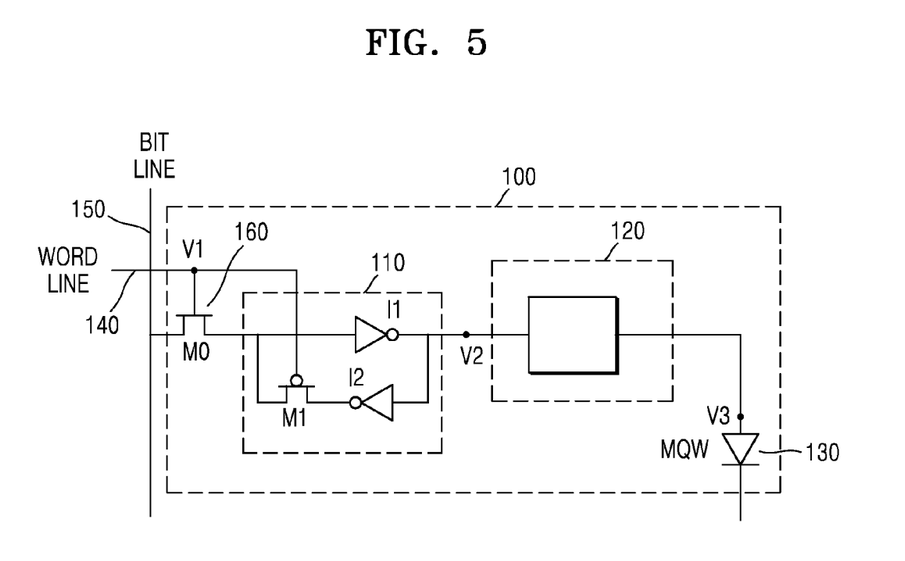
FIG. 5 is a circuit diagram for describing an operation of a pixel according to an exemplary embodiment.

FIG. 5 is a circuit diagram for describing an operation of the pixel 100 according to an exemplary embodiment. The pixel 100, as described above, may include the flip-flop circuit 110, the amplifier 120, the light modulating device 130, a word line 140, a bit line 150, and an on/off transistor 160.

Operations of the flip-flop circuit 110, the amplifier 120, and the light modulating device 130 disclosed in FIG. 5 are as described above with reference to FIG. 4. With respect to FIG. 5, the word line 140, the bit line 150, and the on/off transistor 160 will be described. The flip-flop circuit 110 is a circuit for implementing a static random access memory (SRAM). This is merely an example, and the light modulating apparatus 10 is not limited thereto. For example, dynamic random access memory (DRAM) may be used for the flip-flop circuit 110 to drive the light modulating apparatus 10.

The word line 140 may be connected to one side of the pixel 100, and the bit line 150 may be connected to another side of the pixel 100. A voltage may be applied to the word line 140 selected from among a plurality of word lines respectively connected to a plurality of pixels, including the pixel 100. Once the row driver 20 applies a voltage, the voltage is transferred from the row driver 20 to the plurality of pixels through the word line 140 to select one or more pixels included in a certain row.

Pixels included in a row of the selected word line 140 may receive the device driving signal from the column driver 30 through the bit line 150 connected thereto.

The on/off transistor 160 may be connected to the row driver 20 through the word line 140 and may be connected to the column driver 30 through the bit line 150. The on/off transistor 160 may be connected to the word line 140 and the bit line 150. When a voltage is applied to the word line 140 connected to the pixel 100, the on/off transistor 160 may be turned on and may receive the device driving signal from the column driver 30 through the bit line 150. Here, the device driving signal may be expressed as bit data of 0 or 1.

A first voltage V1 of 3.3 V may be applied to a gate of the on/off transistor 160 through the word line 140. The word line 140 is connected to pixel circuits of a certain row which are selected, via the row driver 20, from among a plurality of pixel circuits included in the pixel array 130. In other words, the row driver 20 may select a row of pixel circuits from the pixel array 130 through the word line 140 and then the column driver 30 may select, for example, the pixel 100 from the selected row of pixel circuits through the bit line 150. Alternatively, the column driver 30 may select a column of pixel circuits from the pixel array 130 and then the row driver 20 may select the pixel 100 from the selected column. Also, the column driver 30 and the row driver 20 may operate in parallel in selecting the pixel 100.

When the first voltage V1 is applied to the gate of the on/off transistor 160, the on/off transistor 160 may enter a turn-on state. When the on/off transistor 160 is in the turn-on state, the device driving signal may be transferred from the column driver 30 to the flip-flop circuit 110 through the bit line 150.

The flip-flop circuit 110 may transfer the transferred device driving signal to the amplifier 120. A voltage V2 having the same level as that of the first voltage V1 may be applied in order to transfer the device driving signal from the flip-flop circuit 110 to the amplifier 120. As shown in FIG. 5, the flip-flop circuit 110 may include two inverters I1 and I2 and a register M0 that performs a read function.

The amplifier 120 may amplify a voltage of the transferred device driving signal. A voltage V3 of the amplified device driving signal may change an absorption coefficient of a semiconductor material in the light modulating device 130.

Figure 6:
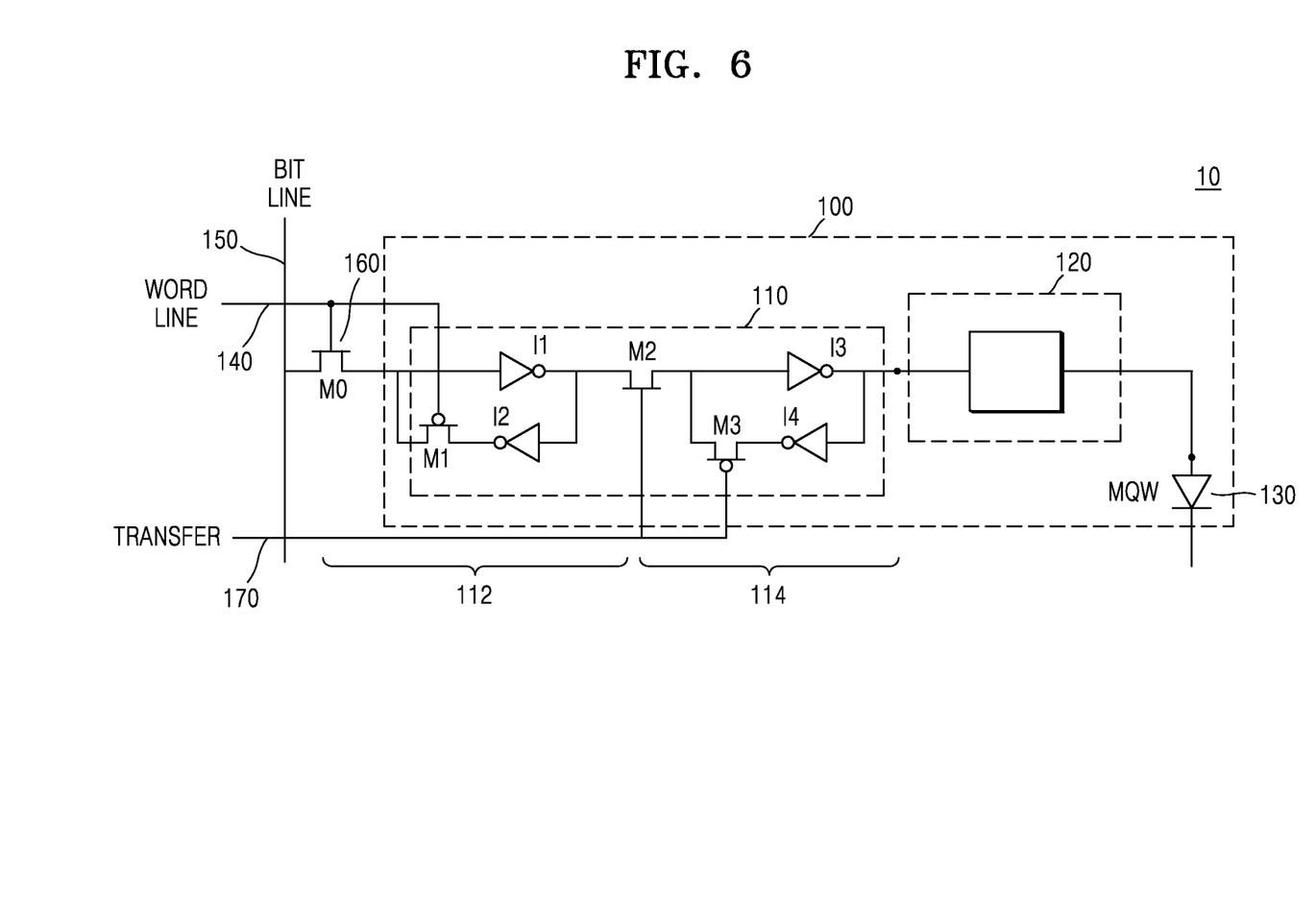
FIGS. 6 and 7 are circuit diagrams for describing an operation of a pixel circuit including two flip-flop circuits, according to another exemplary embodiment.
Figure 7:
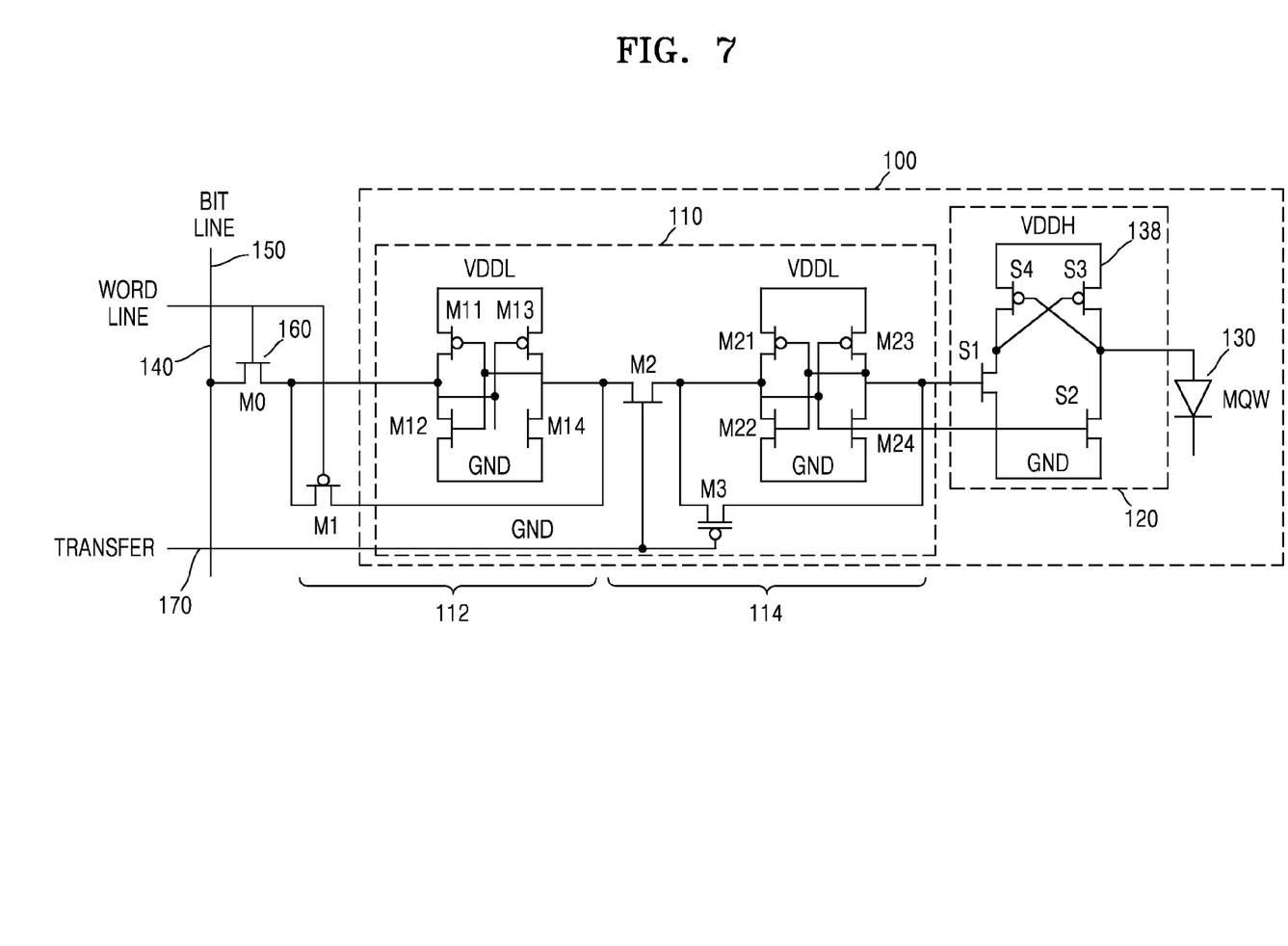

FIGS. 6 and 7 are circuit diagrams for describing an operation of a pixel 100 including two flip-flop circuits, for example, first and second flip-flop circuits 112 and 114, according to another exemplary embodiment.

In FIG. 6, a circuit diagram of the pixel 100, including the two flip-flop circuits 112 and 114, is schematically illustrated.

As shown in FIG. 6, a flip-flop circuit of the pixel 100 may include the first flip-flop circuit 112 and the second flip-flop circuit 114. The first flip-flop circuit 112 may act as a buffer which temporarily stores the device driving signal transferred to the second flip-flop circuit 114. Hereinafter, an operation of the first flip-flop circuit 112 will be described in detail.

The device driving signal may be transferred from the column driver 30 to the pixel 100 which is selected by an intersection point of the word line 140 and the bit line 150. According to FIG. 6, the device driving signal may be transferred from the column driver 30 to the first flip-flop circuit 112 included in the pixel 100. When the first flip-flop circuit 112 according to an exemplary embodiment receives the device driving signal, the first flip-flop circuit 112 may not transfer the device driving signal to the second flip-flop circuit 114 until other pixel circuits receive the device driving signal.

The first flip-flop circuit 112 may receive an output signal from an output control circuit 50 of FIG. 1 when the device driving signal is transferred to all selected pixel circuits. When the first flip-flop circuit 112 receives the output signal, the first flip-flop circuit 112 may transfer the device driving signal to the second flip-flop circuit 114.

The device driving signal transferred to the second flip-flop circuit 114 may be transferred to the amplifier 120. The amplifier 120 may amplify the device driving signal so as to drive the light modulating device 130. When light incident on the pixel 100 is absorbed as a determination result based on the device driving signal, the amplifier 120 may amplify the device driving signal to a level capable of driving the light modulating device 130, and when the light incident on the pixel 100 is transmitted, the amplifier 120 may not amplify the device driving signal.

When the light modulating device 130 receives the amplified device driving signal from the amplifier 120, the light modulating device 130 may increase an absorption coefficient of an MQW included in the light modulating device 130. As the absorption coefficient of the MQW increases, light incident on the pixel 100 is absorbed, and thus, may not be transmitted.

As shown in FIG. 7, the first flip-flop circuit 112 included in FIG. 7 may include four transistors M11 to M14 that perform the same function as that of two pairs of inverters I1 and I2 or I3 and I4 illustrated in FIG. 6, and the second flip-flop circuit 114 may include four transistors M21 to M24.

Moreover, the amplifier 120 may include a first transistor S1, which is connected to a first gate line receiving a first device driving signal from the second flip-flop circuit 114, and a second transistor S2 which is connected to a second gate line receiving a second device driving signal from the second flip-flop circuit 114. Also, the amplifier 120 may include a third transistor S3 and a fourth transistor S4, which are connected to the light modulating device 130.

A first voltage having a VDDL level and a second voltage having a VDDH level, illustrated in FIG. 7, are voltages necessary for driving the first and second flip-flop circuits 112 and 114 and the amplifier 120, respectively. For example, the second voltage may be higher than the first voltage. Although not shown in FIG. 7, each of the first and second flip-flop circuits 112 and 114 may include a first power terminal for receiving the first voltage. Also, the amplifier 120 may include a second power terminal for receiving the second voltage.

Figure 8:
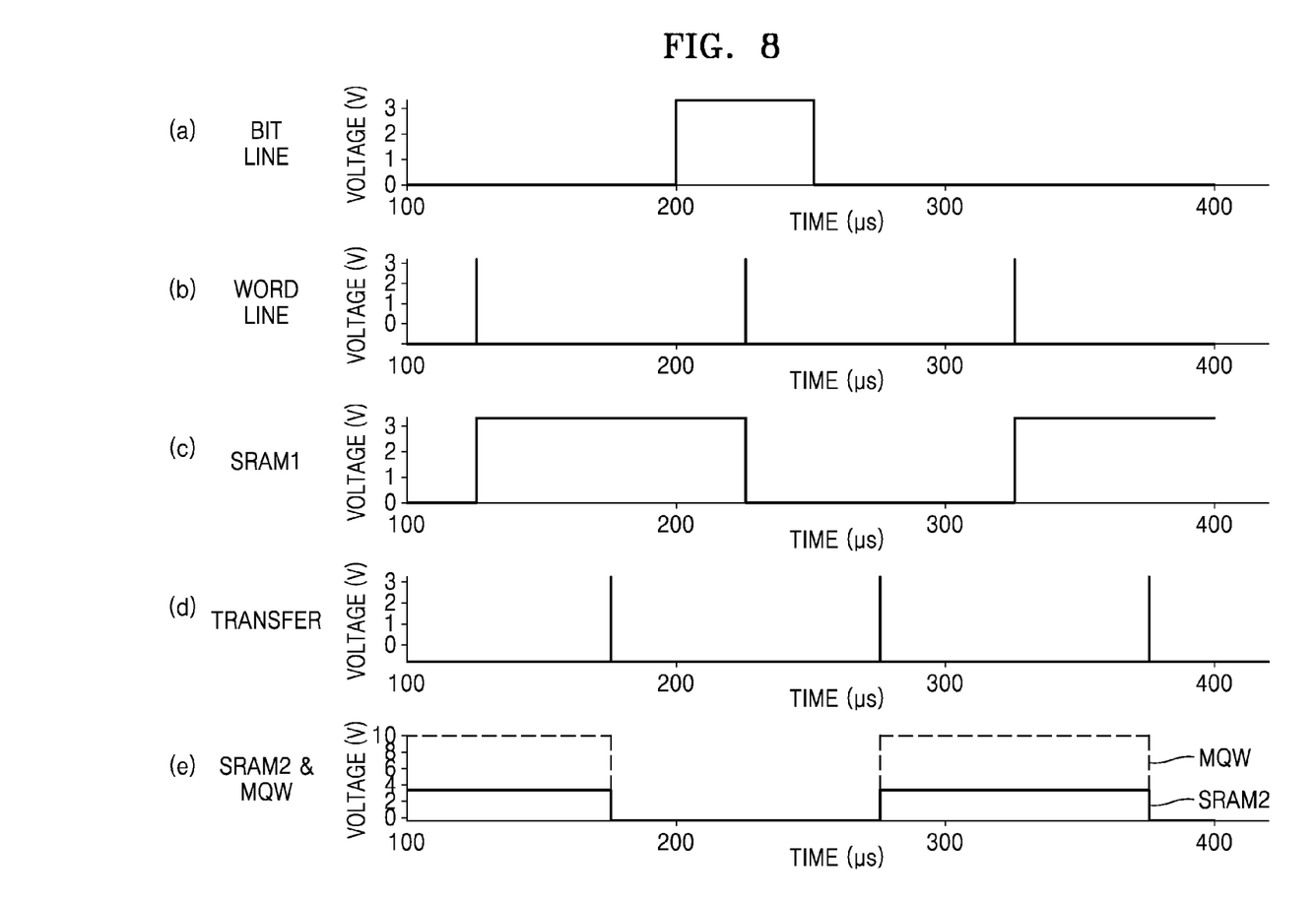
FIG. 8 is a graph for describing an output voltage with respect to time in a light modulating apparatus according to an exemplary embodiment.

FIG. 8 is a graph for describing an output voltage with respect to time in the light modulating apparatus 10 according to an exemplary embodiment.

FIG. 8 (a) indicates that, when a first voltage of 3.3 V is applied to a word line, pixels included in a certain row may be selected from among the plurality of pixels included in the pixel array 40.

FIG. 8 (b) shows that, when the first voltage of 3.3 V is applied to the word line and pixels included in a certain row are selected, the first voltage of 3.3 V may be applied to a bit line connected to the column driver 30.

FIG. 8 (c) shows that, when a voltage is applied to a bit line, the first flip-flop circuit 112 (SRAM1) may acquire the device driving signal from the column driver 30.

FIG. 8 (d) shows that an output signal may be generated when the device driving signal is applied to pixel circuits selected from among a plurality of pixel circuits included in the pixel array 40.

FIG. 8 (e) shows that, as the output signal is generated, the device driving signal may be transferred from the first flip-flop circuit 112 to the second flip-flop circuit 114 (SRAM 2). Here, the device driving signal may be continuously transferred until a next output signal is generated.

As shown in FIG. 8, a voltage applied to the light modulating device 130 is amplified based on the device driving signal transferred to the second flip-flop circuit 114. The amplifier 120 may amplify the first voltage of 3.3 V, applied to a pixel circuit, to a second voltage of 8.5 V, based on the device driving signal transferred to the second flip-flop circuit 114. The amplified second voltage may drive the light modulating device 130 to increase an absorption coefficient of an MQW.

Figure 9:
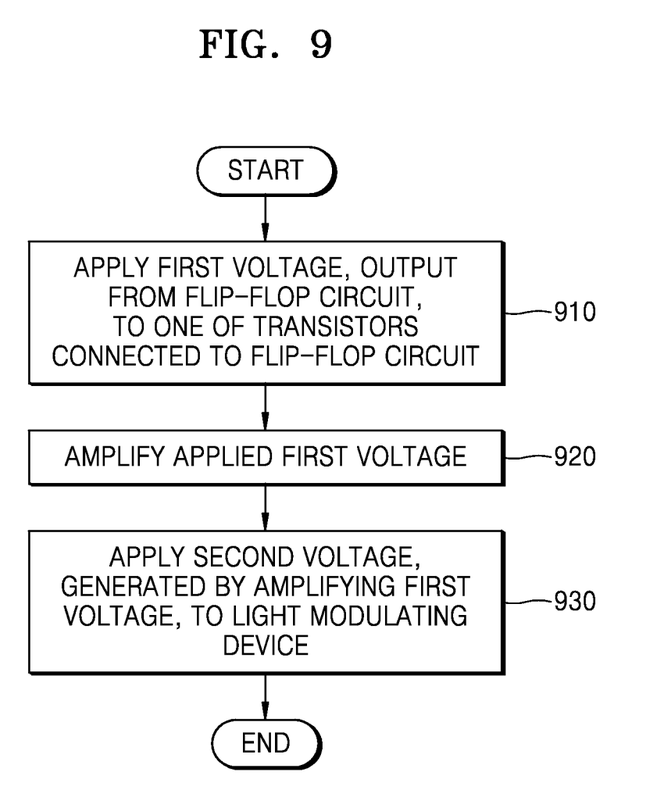
FIG. 9 is a flowchart of a method of driving the light modulating apparatus, according to an exemplary embodiment.

FIG. 9 is a flowchart of a method of driving the light modulating apparatus 10, according to an exemplary embodiment. Here, the light modulating apparatus 10 includes a light modulating device, which absorbs light according to an applied voltage, and a pixel array where a flip-flop circuit, which outputs a voltage applied to the light modulating device based on the device driving signal, is included in each pixel.

In the following description, for convenience of a description, a main element for driving the light modulating apparatus 10 is referred to as a light modulation driving apparatus. Here, the light modulation driving apparatus may be included in the light modulating apparatus 10 and may be implemented by a part, a unit, and a circuit which control the flip-flop circuit 110, the amplifier 120, and the light modulating device 130 included in the light modulating apparatus 10. According to another exemplary embodiment, the light modulation driving apparatus may be provided outside the light modulating apparatus 10 and may transmit or receive data to or from the light modulating apparatus 10 to control the light modulating apparatus 10.

In operation 910, the light modulation driving apparatus applies a first voltage, output from the flip-flop circuit 110, to one of a plurality of transistors connected to the flip-flop circuit 110.

The light modulation driving apparatus may apply the first voltage to a first transistor, which has a drain electrode that is connected to the light modulating device, among the plurality of transistors, based on an acquired first device driving signal. Also, the light modulation driving apparatus may apply the first voltage to a second transistor, which has a source electrode that is connected to the light modulating device, among the plurality of transistors, based on an acquired second device driving signal.

The light modulating apparatus according to an exemplary embodiment may include the pixel array 40. The light modulation driving apparatus may select a pixel, in which a voltage applied from the outside is equal to or higher than a certain value, from among the plurality of pixels included in the pixel array 40. The light modulating apparatus 10 may transfer the device driving signal to the selected pixel 100.

In operation 920, the light modulation driving apparatus amplifies the first voltage applied to the flip-flop circuit 110.

As the first voltage is output to the first transistor of which the drain electrode is connected to the light modulating device, the light modulation driving apparatus may amplify the first voltage to generate a second voltage. For example, a level of the second voltage may be higher than a level of a voltage for changing an absorption coefficient of a material included in the light modulating device.

In operation 930, the light modulation driving apparatus applies the second voltage, generated by amplifying the first voltage, to the light modulating device. As the second voltage is applied, a light absorption coefficient of the material included in the light modulating device may be changed. For example, in an MQW device, when a voltage equal to or higher than a certain value is applied, a light absorption coefficient may increase. When a voltage is applied to the MQW device, and the light absorption coefficient increases, an absorption rate of light incident on a pixel increases, and thus, light passing through the pixel is considerably reduced.

An apparatus according to the exemplary embodiments may include a processor, a memory storing and executing program data, a permanent storage such as a disk drive, a communication port for communication with an external device, a user interface device such as a touch panel, keys or buttons, and the like. Methods embodied as a software module or an algorithm may be stored on a computer-readable recording medium as computer readable codes or program commands executable by the processor. Examples of the computer-readable recording medium include magnetic storage media (e.g., ROM, floppy disks, hard disks, etc.), optical recording media (e.g., CD-ROMs, or DVDs), and the like. The computer-readable recording medium may also be distributed over network-coupled computer systems so that the computer readable code is stored and executed in a distributed fashion. The medium may be read by a computer, stored in a memory, and executed by the processor.

The exemplary embodiments may be embodied as functional blocks and various processing operations. The functional blocks may be implemented with various hardware and/or software configurations executing specific functions. For example, the exemplary embodiments may employ integrated circuit configurations such as a memory, processing, logic, a look-up table and the like capable of executing various functions upon control of microprocessors or other control devices. In a similar manner to that in which the elements of the exemplary embodiments may be executed with software programming or software elements, the exemplary embodiments may be implemented with a scripting language or a programming language such as C, C++, Java, assembler, and the like, including various algorithms implemented by a combination of data structures, processes, processes, routines or other programming configurations. The functional aspects may be implemented by algorithms executed in one or more processors. Also, the exemplary embodiments may employ conversional arts to establish an electronic environment, process signals and/or process data. The terms "mechanism", "element", "means", and "configuration" may be widely used and are not limited to mechanical and physical configurations. Such terms may have the meaning of a series of routines of software in association with a processor or the like.

Specific executions described herein are merely examples and do not limit the scope of the inventive concept in any way. For simplicity of description, other functional aspects of conventional electronic configurations, control systems, software and the systems may be omitted. Furthermore, line connections or connection members between elements depicted in the drawings represent functional connections and/or physical or circuit connections by way of example, and in actual applications, they may be replaced or embodied as various additional functional connection, physical connection or circuit connections.

The singular forms "a," "an", and "the" in this present disclosure, in particular, claims, may be intended to include the plural forms as well. Unless otherwise defined, the ranges defined herein is intended to include any invention to which values within the range are individually applied and may be considered to be the same as individual values constituting the range in the detailed description of the exemplary embodiments. Finally, operations constituting the method of the exemplary embodiments may be performed in appropriate order unless explicitly described in terms of order or described to the contrary. The exemplary embodiments are not necessarily limited to the order of operations given in the description. The examples or exemplary terms (for example, etc.) used herein are to merely describe the embodiments in detail and not intended to limit the embodiments unless defined by the following claims. Also, those of ordinary skill in the art will readily appreciate that many alternation, combination and modifications, may be made according to design conditions and factors within the scope of the appended claims and their equivalents.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A light modulating apparatus comprising:
   a pixel array including a plurality of pixels on which light is incident;
   a light modulating device configured to adjust an amount of the incident light to be absorbed according to an applied voltage;
   a flip-flop circuit configured to output a first voltage based on a device driving signal indicating a level of a second voltage to be applied to the light modulating device; and
   an amplifier configured to amplify the first voltage to the second voltage and apply the second voltage to the light modulating device,
   wherein the light modulating device, the flip-flop circuit and the amplifier are included in each of the plurality of pixels.

2. The light modulating apparatus of claim 1, wherein,
   the flip-flop circuit is further configured to apply the first voltage to a first transistor, which has a drain electrode that is connected to the light modulating device, among a plurality of transistors configuring the amplifier, based on a first device driving signal, and apply the first voltage to a second transistor, which has a source electrode that is connected to the light modulating device, among the plurality of transistors configuring the amplifier, based on a second device driving signal.

3. The light modulating apparatus of claim 2, wherein the first voltage is output to the first transistor, and the amplifier is further configured to amplify the first voltage to the second voltage and apply the second voltage to the light modulating device.

4. The light modulating apparatus of claim 1, wherein a light absorption coefficient of a material which is included in the light modulating device is changed in response to the second voltage being applied to the light modulating device.

5. The light modulating apparatus of claim 1, wherein,
   each of the plurality of pixels comprises:
   a word line;
   a bit line; and
   an on/off transistor, and
   in response to a voltage applied to the word line being equal to or higher than a certain value, the on/off transistor receives the device driving signal through the bit line.

6. The light modulating apparatus of claim 1, wherein the flip-flop circuit comprises:
   a first flip-flop circuit that stores the first voltage acquired based on the device driving signal; and
   a second flip-flop circuit that is connected to the first flip-flop circuit and outputs the stored first voltage to the amplifier.

7. The light modulating apparatus of claim 6, wherein when the first voltage is stored in a corresponding pixel included in the pixel array, the first flip-flop circuit outputs the first voltage stored in the second flip-flop circuit.

8. The light modulating apparatus of claim 6, further comprising an output control circuit that supplies an output signal to the first flip-flop circuit and the second flip-flop circuit in response to the first voltage being stored in a corresponding pixel included in the pixel array.

9. The light modulating apparatus of claim 1, wherein the amplifier is connected between the flip-flop circuit and the light modulating device.

10. The light modulating apparatus of claim 1, wherein the light modulating device comprises a diode that includes a multi quantum well (MQW) material.

11. A method of driving a light modulating apparatus including a pixel array, a light modulating device, and a flip-flop circuit, the method comprising:
   outputting a first voltage from the flip-flop circuit;
   applying the first voltage to one of a plurality of transistors connected to the flip-flop circuit;
   amplifying the applied first voltage to a second voltage;

applying the second voltage to the light modulating device; and adjusting an amount of light to be absorbed by the light modulating device according to the applied second voltage, wherein the light modulating device, the flip-flop circuit and the amplifier are included in each of the plurality of pixels.

12. The method of claim 11, wherein, the flip-flop circuit applies the first voltage to a first transistor, which has a drain electrode that is connected to the light modulating device, among a plurality of transistors, based on a first device driving signal, and the flip-flop circuit applies the first voltage to a second transistor, of which a source electrode is connected to the light modulating device, among the plurality of transistors, based on a second device driving signal.

13. The method of claim 12, wherein the amplifying comprises amplifying the first voltage to generate the second voltage in response to the first voltage being output to the first transistor and applying the generated second voltage to the light modulating device.

14. The method of claim 11, wherein the adjusting comprises changing a light absorption coefficient of a material included in the light modulating device in response to the second voltage being applied to the light modulating device.

15. The method of claim 11, further comprising:

selecting, from the pixel array, a pixel to which a voltage being equal to or higher than a certain value is applied; and transferring a device driving signal to the selected pixel.

16. The method of claim 15, wherein the amplifying comprises:

storing the first voltage, acquired based on the device driving signal, in the selected pixel; and amplifying the first voltage stored in the selected pixel.

17. The method of claim 16, further comprising outputting the stored first voltage to one of the plurality of transistors in response to the first voltage being stored in a corresponding pixel included in the pixel array.

18. The method of claim 16, further comprising:

generating an output signal in response to the first voltage being stored in the corresponding pixel included in the pixel array; and transferring the output signal to the pixel selected from the pixel array.

19. The method of claim 11, wherein the light modulating device comprises a diode that includes a multi quantum well (MQW) material.

* * * * *